June 24, 1930.                F. H. OWENS                1,765,997
METHOD FOR SYNCHRONIZING SOUND AND MOTION PICTURES
Filed Jan. 3, 1927            2 Sheets-Sheet 1
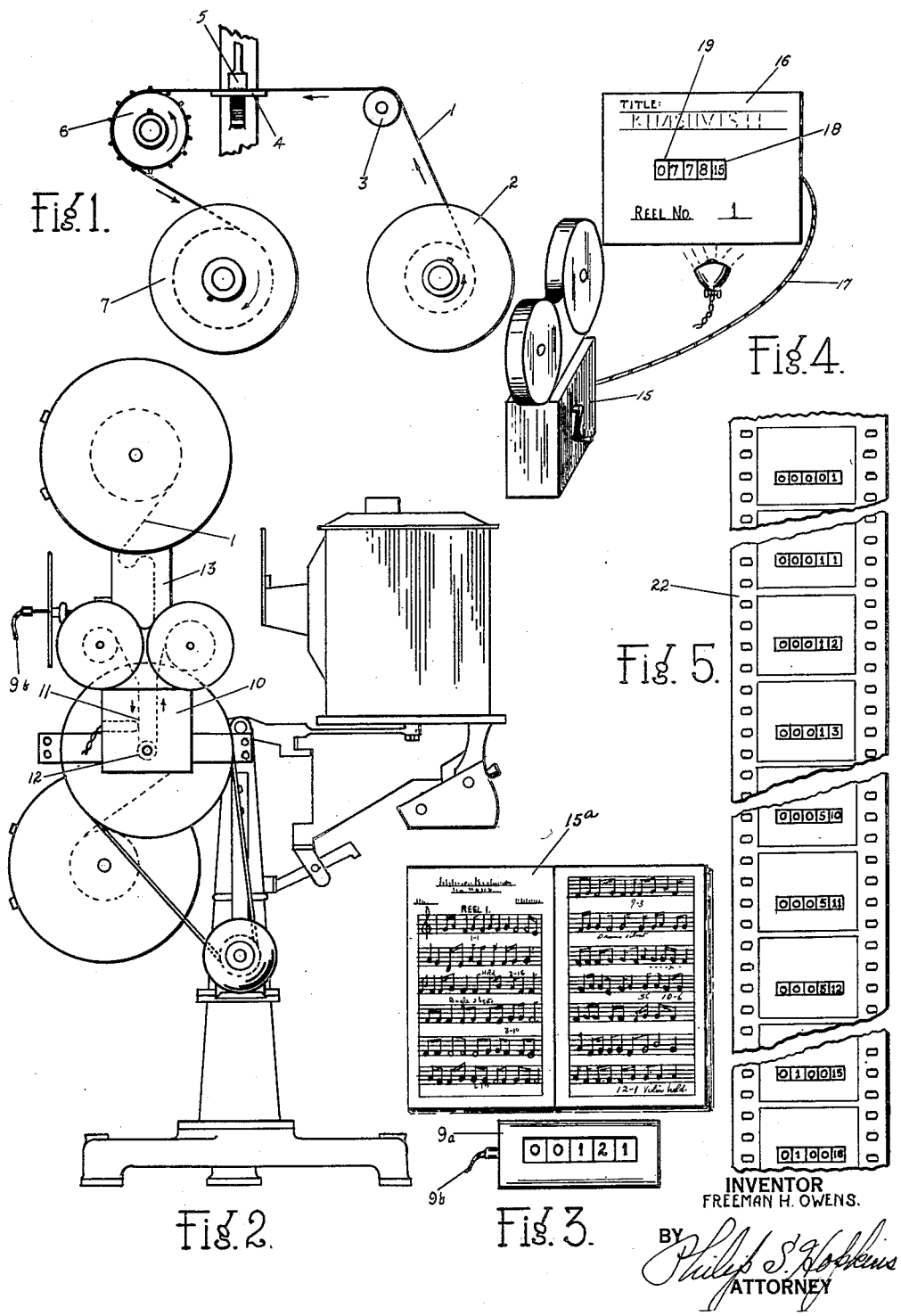
INVENTOR
FREEMAN H. OWENS.
BY
ATTORNEY June 24, 1930.　　　　F. H. OWENS　　　　1,765,997

METHOD FOR SYNCHRONIZING SOUND AND MOTION PICTURES

Filed Jan. 3, 1927　　　　2 Sheets-Sheet 2

INVENTOR
FREEMAN H. OWENS.
BY
ATTORNEY

Patented June 24, 1930

1,765,997

UNITED STATES PATENT OFFICE

FREEMAN H. OWENS, OF NEW YORK, N. Y.

METHOD FOR SYNCHRONIZING SOUND AND MOTION PICTURES

Application filed January 3, 1927. Serial No. 158,692.

With the advent of the recording and reproduction of sound photographically, there is open to the motion picture industry the possibility of recording on the same film with the pictures the music appropriate to the pictures which in the past has been furnished by an orchestra or artists in the theater at the time the picture is shown. By thus recording the orchestration or other sound appropriate to the pictures on the same film with the pictures, the theater owner booking one of these films for showing can by the addition of a sound reproducing device to his projector, and suitable amplifiers, furnish the music from the film instead of going to the expense of an orchestra, etc.

As this description proceeds, it will be apparent also that my invention is equally adaptable to talking or singing or other sound, wherein the characters speak or sing directly from the film.

The principal advantage, however, of my invention is in the provision of a method for the synchronous recording of an orchestration or other music appropriate to a motion picture, with the picture, so that when the picture is projected and the sound reproduced, the two will be perfectly synchronized.

In view of the fact that many motion pictures particularly the feature films, are made in a series of reels, usually from 1 to 6 in number, it will be understood that this synchronism between the sound record and the pictures must be perfect so that the transition from one reel to another, usually made by the alternate operation of two projectors, may not show an interruption or break in the continuity of sound and picture.

Many objects and advantages by way of detail will be apparent as the description proceeds, reference now being had to the accompanying drawings illustrating diagrammatically the various steps of my method, and wherein like reference numerals indicate like parts.

In the drawing:—

Figure 1 is a diagrammatic view illustrating one method of printing visual numbers on the picture film, as one step of my invention.

Figure 2 is a side view of a motion picture projection apparatus with which is combined a sound recording camera used in one of the steps of my invention.

Figure 3 illustrates the music score used by the orchestra leader or artist during the recording of the sound, and marked with suitable indicia in accordance with the visual footage numbers on the picture film.

Figure 4 illustrates diagrammatically an apparatus for photographing a chart having changeable numbers whereby the sound film may be numbered for a purpose to be described.

Figure 5 is a detail view of a film or paper strip or chart which may be used by way of modification and in lieu of the apparatus illustrated in Figure 4.

Figure 6:
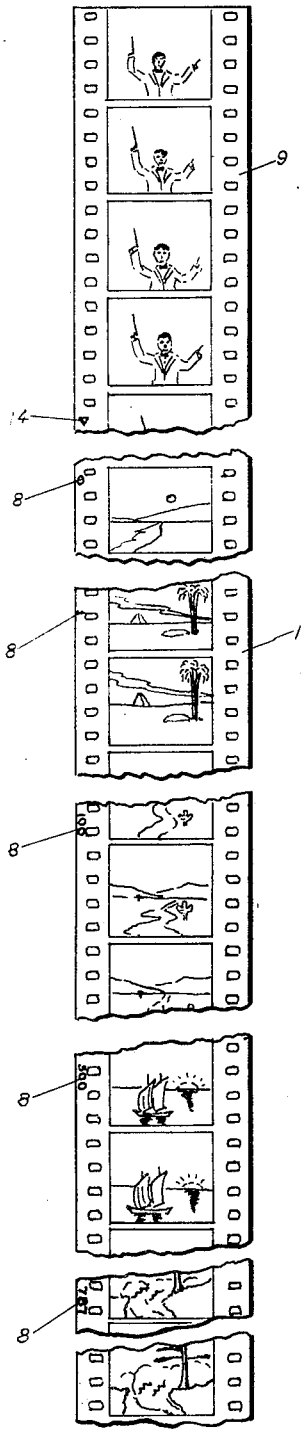
Figure 6 is a detail view of a section of the picture film provided with the visual numbers placed thereon by the apparatus shown in Figure 1, and provided with a leader strip, this film being broken at various points for purpose of clearness.

In recording the music, for instance, the orchestration appropriate to a motion picture, which for purpose of illustration, we will say is three reels in length, we will assume first that the picture has been made, developed, edited, and a positive print made therefrom, which may be projected to a screen. These negative and positive film strips are of course matched foot for foot so that the subsequent sound record made in synchronism with the positive strip, will likewise synchronize with the negative for final printing purposes. It is now desired to record the music appropriate to this picture in order that the sound record may be printed on a film together with the pictures, so as to permit its reproduction simultaneously with the showing of the film. The first step of my method consists in printing upon the picture film at intervals of one foot, visual numbers beginning with zero and running consecutively to the end of each reel. One means of printing such numbers is illustrated in Figure 1 of the drawings wherein the picture film 1 is pulled from the reel 2 over an idle roller 3 and over a flat supporting surface 4 above which is mounted a reciprocating numbering device 5 of any desired construction which will at each movement downward into engagement with the film, print successive numbers on said film preferably between one edge thereof and the usual perforations. The film is drawn from the reel 2 by means of a sprocket 6 around which said film passes, said sprocket being of such size as to pull one foot of film past the numbering device 5 at each complete revolution. A take up reel 7 is provided upon which the numbered film may be wound in any suitable manner.

Figure 6 illustrates certain sections of the film 1 which have been printed with the visual numbers indicated at 8.

When each of the three reels of the picture film 1 have been so numbered from zero to whatever number of feet each reel consists of, the arrangement of the music appropriate to the pictures can now proceed.

In order that the orchestra may start at precisely the proper moment with relation to the picture film, I preferably attach to the beginning of reel 1 a leader strip 9 indicated in Figure 6, which leader strip is also a length of film bearing the pictures of an orchestra leader or conductor with his baton, going through the usual motion preparatory to starting the orchestra. This leader strip is so arranged that the last picture of it before beginning the actual picture film shows the conductor bringing his baton down to start the orchestra. Of course, the end of this leader strip may be attached to the picture film at the point where the pictures themselves begin, but usually is attached to the picture film just prior to the beginning of the title frames, or at least at the point on said film at which it is desired to start the music.

With the picture film, now numbered, and the leader strip attached, it is projected to a screen in the ordinary manner, and, with the orchestra assembled ready to play the orchestration appropriate to the picture. The orchestra, or the director thereof, watches the leader strip and starts playing simultaneously with the motion of the conductor on the film. From this point on they play according to the actual conductor, who stands before them and watches the film as it is projected. It usually requires several preliminary or trial projections of each reel before the orchestra leader can properly judge the tempo and starting and stopping points, so that his music will fit perfectly with the picture. As this process of arranging the music to fit the picture progresses, the leader marks on his conducting score certain indicating marks or indicia, such as starts of titles, scenes, etc., to guide him in the conduct of the orchestra at various points of the picture. This indicia may take the form of the footage numbers which have been printed on the picture film and which he can ascertain at any given point by reference to a footage counter $9^a$, driven by a flexible shaft $9^b$ from the shutter shaft of the projector, and which is preferably located adjacent his conducting score.

When the music has been arranged and practiced, and is ready for recording to synchronize with the picture film, the sound camera indicated in Figure 2 by the reference numeral 10 is loaded with a reel of sensitized film, the film being indicated at 11 in dotted lines and as shown is brought down under and around a sprocket 12, which sprocket is of the same size and mounted upon the same shaft with the sprocket which moves the picture film 1 through the projection apparatus 13. It is not believed necessary to describe in detail either the projection apparatus nor the sound camera 10. Both are of the usual type, and in the sound camera a photographic sound record of the music is made on a continuously moving film, as it is played by the orchestra.

Figure 7:
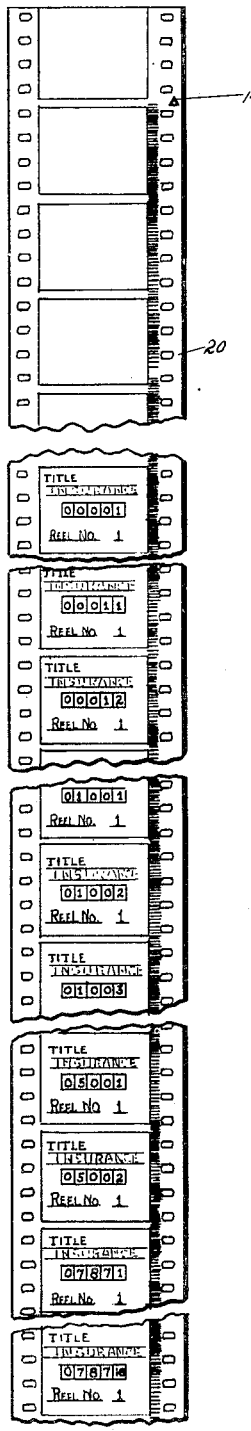
Figure 7 is a detail view of a strip of the film on which the sound record has been made and on which there has also been photographed the chart illustrated in Figure 4. This film is also broken away for clearness of illustration.

It should be stated here that the picture film and the sensitized film to receive the sound record should be so co-related in the projector and sound camera respectively, that upon the projection to the screen of the leader strip 9 showing the orchestra conductor, the film in the sound camera will be in position to receive the sound record simultaneously and at the same instant that the leader strip indicates the starting of the orchestra. In order to insure this synchronism of picture film with the beginning of the sound record, each film may be provided with an indicating mark 14 as shown in Figures 6 and 7. The picture film and the sound film can, therefore, be threaded through their respective apparatus in such manner that when the indicating mark 14 on the picture film is opposite the projection lens, the same indicating mark 14 will be opposite the sound recording slit in the sound camera.

With these preliminaries arranged, the projection of the picture is begun and at the proper moment as above indicated, the orchestra is started and plays during the showing of the picture, led by the conductor from his music score $15^a$, shown in Figure 3, which has already been marked in accordance with the picture. Obviously then, as the picture is projected to the screen, the music appropriate thereto will be recorded simultaneously, foot for foot, and frame for frame of film, due to the fact that both the picture and sound films are moved by a single shaft or driving mechanism at exactly the same rate of speed.

As the end of the reel 1 is reached, in the projection to the screen, I preferably continue to project the first few feet of reel number 2, the orchestra continuing its music in accordance with the pictures so that there will be recorded on the end of reel 1 of the sound negative, the first part of the music of reel 2.

At this point, the orchestra is stopped, as is the projection of the picture film, and consequently the sound recording device. Further reference will be made later to the negative of the sound record just made of reel 1. A fresh reel of sensitized film is now put in the sound camera in readiness to record the music appropriate to reel 2 of the picture film.

There is now attached to the starting end of reel 2 of the picture film, the last few feet of reel 1, and the footage numbers thereof being noted on the conductor's music score. The leader strip 9 is again made use of, being attached to the starting end of the few feet of film of reel 1 now preceding the beginning of reel 2. The leader strip is now projected to the screen and the orchestra is held in readiness to begin to play. At the proper instant, as indicated by the leader strip, they will play over the music appropriate to the last few feet of picture film of reel 1 as it is projected, and then continue on without interruption, with the music of reel 2, the picture film and the sensitized film for the sound record having of course been threaded in their respective apparatus so that the indicating marks 14 will be co-related in order that the recording of the sound will begin simultaneously with the beginning of the projection of the first picture following the leader strip 9.

It will be noted here that the last part of the music for reel 1 has been recorded again, as has the first part of the music for reel 2, on this new strip of sensitized film and that notations have been made on the conductor's score of the footage numbers of these duplications. The purpose of these operations will be described later.

The projection of reel 2 continues and the recording of the music likewise proceeds, the same as in the previous reel until the end is reached, whereupon the same process as before described is repeated. Reel 3 is then prepared, as was reel 2, with the last few feet of reel 2 and with the leader strip 9 and the same steps are taken to record reel 3 as in the two previous reels. Of course any number of reels can be so recorded.

With the completion of the sound record, the negative of the sound record for reel 1 is now placed in a motion picture camera indicated in Figure 4 at 15, which may be of any conventional type of design. In line with this camera and in position for being photographed on the negative therein, is a chart 16 bearing first the title of the picture, secondly an indication of the reel number and third a counter device which is connected to the camera 15 as by a flexible driving shaft 17 whereby the numbers on this counter will change synchronously with the operation of the intermittent camera mechanism. The driving relation between the camera and the counter is such that the counter registers a new number consecutively for each foot and frame of film driven through the camera. One subdivision of the counter, indicated at 18, is divided into 16 sections and numbered consecutively from 1 to 16 to represent the frames of each foot registered by the counter device indicated at 19.

The result of this operation is that there is photographed on the film 20, the sound negative of reel 1, beginning with the indicating mark 14 corresponding to the zero footage mark on the picture film, images of the chart board 16 on which are registered the exact footage and the frame for each foot, corresponding exactly to the footage and frames of the picture film.

With reference now to Figure 5, a modified means is shown which may take the place of the apparatus illustrated in Figure 4. It desired, instead of photographing by a separate camera and numbering device, the footage chart 16, there may be provided a strip of film 22 bearing footage and frame numbers already printed thereon and from which these numbers may be printed on to the sound film by the usual contact or optical printing method.

This same operation is of course performed for reels 2 and 3, the chart being changed to indicate the appropriate reel, and the footage numbers being adjusted to those noted by the conductor with regard to the duplication of sound record on the ends of the reels as they were projected.

When the negative sound films are developed, they will carry the visual record of the footage of each film corresponding exactly to the footage of the picture film 1. It will be recalled at this point that on the last end of reel 1, both ends of reel 2, and the starting end of reel 3, of the negative sound films, there is a duplication of a portion of the sound record of the succeeding or preceding reel. With the footage indications now visible on both the picture and sound films however, these films can be matched according to such footage numbers, and the ends of the reels bearing the duplicate sound records may be cut off and spliced at exactly the proper foot and frame so as to register perfect continuity with the beginning of the sound record on the succeeding reel.

Figure 8:
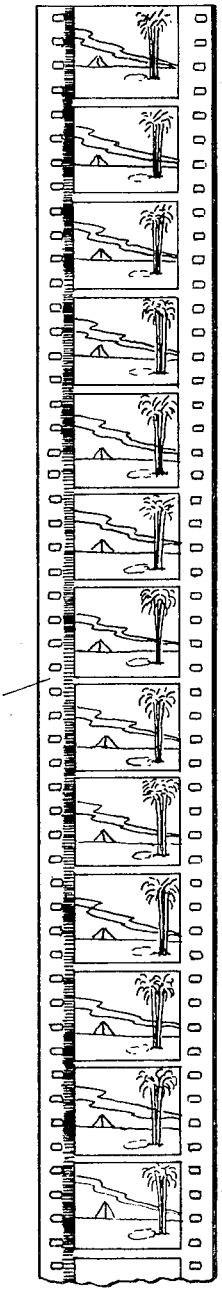
Figure 8 is a detail view of a section of the completed film having the picture and the appropriate sound record both printed thereon.

The next step is to print on to a single positive film, both the pictures from the negative picture film and the sound record from the negative sound film. In doing so, it is necessary that the footage numbers on both the picture and sound films correspond frame for frame. The resultant film is indicated at 21 in Figure 8 and this film may be projected and the sound reproduced by the usual combination projector and sound reproducer, thereby affording the music appropriate to the picture directly from the picture film itself and in perfect synchronism therewith.

Of course, many changes may be made in details of the foregoing steps and arrangement, and in the apparatus used. I do not limit myself therefore to the exact form shown other than by the appended claims.

I claim:—

1. The process of making a sound film which is to be used in conjunction with a picture film comprising the steps of photographically recording sound upon a portion of a film strip, passing the film strip through a motion picture camera, operating measuring means in conjunction with the camera, measuring the length of the film passing through the camera, visually indicating the length of film which passes through the camera upon the measuring means, and photographing these indications upon the portion of the film adjacent to the sound record corresponding to the length indicated.

2. In an arrangement for making identification marks upon film strips the combination of, a partially exposed film strip bearing a sound record on the exposed portion thereof, a motion picture camera for exposing the unexposed portion of said film strip, means for measuring the footage of a film strip passing through said camera and means connected with said camera for operating said first means when said camera is operated so that the footage of the film passing through the camera may be recorded upon the unexposed portion of said film strip.

3. The method of synchronizing sound and motion pictures comprising the steps of printing visual footage numbers on the picture film, visually scoring a sound guide in accordance with said footage numbers, simultaneously projecting the picture film and photographically recording the sound produced in accordance with said guide maintaining the rate of movement of said film visible at the source of sound, providing the sound film record with footage numbers corresponding to the footage numbers on the picture film, and matching the footage numbers of both films.

4. The method of synchronizing sound and motion pictures comprising the steps of printing visual footage numbers on the picture film, scoring a sound guide in accordance with said numbers, simultaneously projecting the picture and photographically recording the sound produced in accordance with said scored guide maintaining the rate of movement of said film visible at the source of sound, photographing footage numbers and other identifying data on said sound film, the footage numbers thereof corresponding to the footage numbers of the picture film, and matching the picture and sound films in accordance with said footage numbers and said identifying data.

5. The method of synchronizing sound and motion pictures comprising the steps of printing visual footage numbers on the picture film, scoring a sound guide in accordance with said picture film, simultaneously projecting the picture film and recording photographically the sound produced in accordance with said guide maintaining the rate of movement of said film visible at the source of sound, photographing on the sound film footage numbers corresponding to the footage numbers on the picture film, matching the numbers of both films, and printing on a single film the matched sound record and pictures.

6. The method of synchronizing sound and motion pictures for the projection of a plurality of related reels of film in succession which consists in simultaneously projecting pictures and recording sound appropriate thereto, maintaining the rendition of sound in accordance with the display of pictures for a given reel, commencing the projection of the succeeding reel of pictures prior to the end of the projection of the first mentioned reel for recording on the first reel sound appropriate to the beginning of the pictures of the second reel, reprojecting the last portion of the picture film of the first reel before the commencing of the picture on the second reel, and duplicating the rendition of sound appropriate to the last portion of the picture film of the first reel and then continuing the rendition of sound appropriate to the second reel at a rate visible from the source of sound.

7. The method of synchronizing sound and motion pictures comprising the steps of providing a picture film with footage marks, scoring a sound guide in accordance with said picture film, simultaneously projecting said picture film and photographically recording sound made in accordance with said guide while maintaining the rate of movement of said footage marks visible at the source of sound, providing the photographic sound record with footage marks corresponding to those of said picture film and matching the footage marks of both films.

8. The method of synchronizing sound and motion pictures comprising the steps of providing a picture film with footage marks, providing a sound guide at the source of sound, scoring said sound guide in accordance with said picture film, simultaneously projecting the picture film and photographically recording sound made in accordance with said guide while maintaining the rate of movement of said film visible at the source of sound, photographing footage marks on said sound film corresponding to those on said picture film and matching for printing the two films in accordance with said footage marks.

9. The method of synchronizing sound and motion pictures comprising the steps of printing visual footage numbers on a picture film, scoring sheet music in accordance with said picture film, simultaneously projecting said picture film and photographically recording sound appropriate to said music while maintaining the rate of movement of said film visible at the source of sound, photographing on the sound film a chart of footage numbers changing synchronously with the operation of photographing the same and matching the footage numbers of both films.

FREEMAN H. OWENS.